(12) United States Patent
Komatsu et al.

(10) Patent No.: US 10,951,127 B2
(45) Date of Patent: Mar. 16, 2021

(54) POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Hiroyoshi Komatsu, Tokyo (JP); Takehiro Takahashi, Tokyo (JP); Yukihisa Iijima, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 60 days.

(21) Appl. No.: 16/464,007

(22) PCT Filed: Nov. 29, 2016

(86) PCT No.: PCT/JP2016/085418
§ 371 (c)(1),
(2) Date: May 24, 2019

(87) PCT Pub. No.: WO2018/100645
PCT Pub. Date: Jun. 7, 2018

(65) Prior Publication Data
US 2020/0350828 A1 Nov. 5, 2020

(51) Int. Cl.
*H02M 7/00* (2006.01)
*H02M 1/14* (2006.01)
*H02M 5/458* (2006.01)

(52) U.S. Cl.
CPC ............. *H02M 7/003* (2013.01); *H02M 1/14* (2013.01); *H02M 5/4585* (2013.01)

(58) Field of Classification Search
CPC ....... H02M 7/003; H02M 1/14; H02M 5/4585
See application file for complete search history.

(56) References Cited

U.S. PATENT DOCUMENTS

2014/0233282 A1* 8/2014 Ohoka .................... H02M 1/14
363/39
2015/0085549 A1 3/2015 Komatsu et al.
2016/0261179 A1* 9/2016 Blanchard ............. H05K 1/165

FOREIGN PATENT DOCUMENTS

| CN | 104380587 A | 2/2015 |
| JP | 2006-74918 A | 3/2006 |
| WO | WO 2013/179463 A1 | 12/2013 |

OTHER PUBLICATIONS

Combined Chinese Office Action and Search Report dated Jul. 8, 2020, in Patent Application No. 201680091186.3 (with English translation), 15 pages.

(Continued)

*Primary Examiner* — Kyle J Moody
(74) *Attorney, Agent, or Firm* — Oblon, McClelland, Maier & Neustadt, L.L.P.

(57) ABSTRACT

A power conversion apparatus includes a plurality of power conversion units, a common bus bar, and a plurality of unit bus bars provided so as to correspond to the plurality of the power conversion units respectively and connecting each DC side of the plurality of the power conversion units to the common bus bar. Each of the power conversion units includes a casing having a first surface on which a first outer plate of a magnetic material is arranged, and the first outer plate is arranged in a vicinity of a corresponding unit bus bar and faces the corresponding unit bus bar with a gap so that an inductance value of the corresponding unit bus bar is increased to an inductance value capable of suppressing an inflow of a ripple current from another power conversion unit in the power conversion apparatus.

10 Claims, 6 Drawing Sheets

(56) References Cited

OTHER PUBLICATIONS

International Search Report dated Jan. 17, 2017 in PCT/JP2016/085418 filed Nov. 29, 2016.
English translation of the International Preliminary report on Patentability dated Jun. 13, 2019 in PCT/JP2016/085418, 6 pages.
Extended European Search Report dated Jun. 9, 2020 in corresponding European Patent Application No. 16922953.1, 7pages.

* cited by examiner

POWER CONVERSION APPARATUS

TECHNICAL FIELD

The present invention relates to a power conversion apparatus which has a plurality of power conversion units

BACKGROUND ART

Generally, in order to construct a large-capacity power conversion apparatus, a configuration is known in which the DC sides of a plurality of power conversion circuits are connected in parallel. Each of these power conversion circuits includes a plurality of power semiconductor devices such as semiconductor switching elements.

Moreover, for the purpose of the reduction of power loss, many of the power conversion apparatus are often configured to reduce the impedance of the various conductors in the apparatus.

However, in the case of a power conversion apparatus including a plurality of power conversion circuits connected in parallel on the DC side, there is a case where a ripple current caused by a switching operation of the semiconductor switching element in one of the power conversion circuits flows into another power conversion circuit. In the power conversion apparatus configured to reduce the impedance of the conductor, since the ripple current is not easily reduced, the influence due to the ripple current inflow is liable to become apparent.

PRIOR ART DOCUMENT

Patent Document

[Patent Document 1] International Publication No. 2013/179463

SUMMARY

Problems to be Solved by the Invention

An object of the present invention is to provide a power conversion apparatus capable of suppressing inflow of a ripple current.

Solution to Problem

A power conversion apparatus according to an aspect of the present invention includes: a plurality of power conversion units including at least a first power conversion unit including a plurality of semiconductor switching elements and converting AC power into DC power and a second power conversion unit including a plurality of semiconductor switching elements and converting DC power into AC power, a common bus bar; and a plurality of unit bus bars provided so as to correspond to the plurality of power conversion units respectively and connecting each DC side of the plurality of power conversion units to the common bus bar.

Each of the plurality of the power conversion units includes a casing having a first surface on which a first outer plate of a magnetic material is arranged, and the first outer plate is arranged in a vicinity of a corresponding unit bus bar and faces the corresponding unit bus bar with a gap so that an inductance value of the corresponding unit bus bar is increased to an inductance value capable of suppressing an inflow of a ripple current from another power conversion unit in the power conversion apparatus.

DETAILED DESCRIPTION OF THE EMBODIMENTS

Hereinafter, embodiments of the present invention will be described with reference to the drawings.

Figure 1:
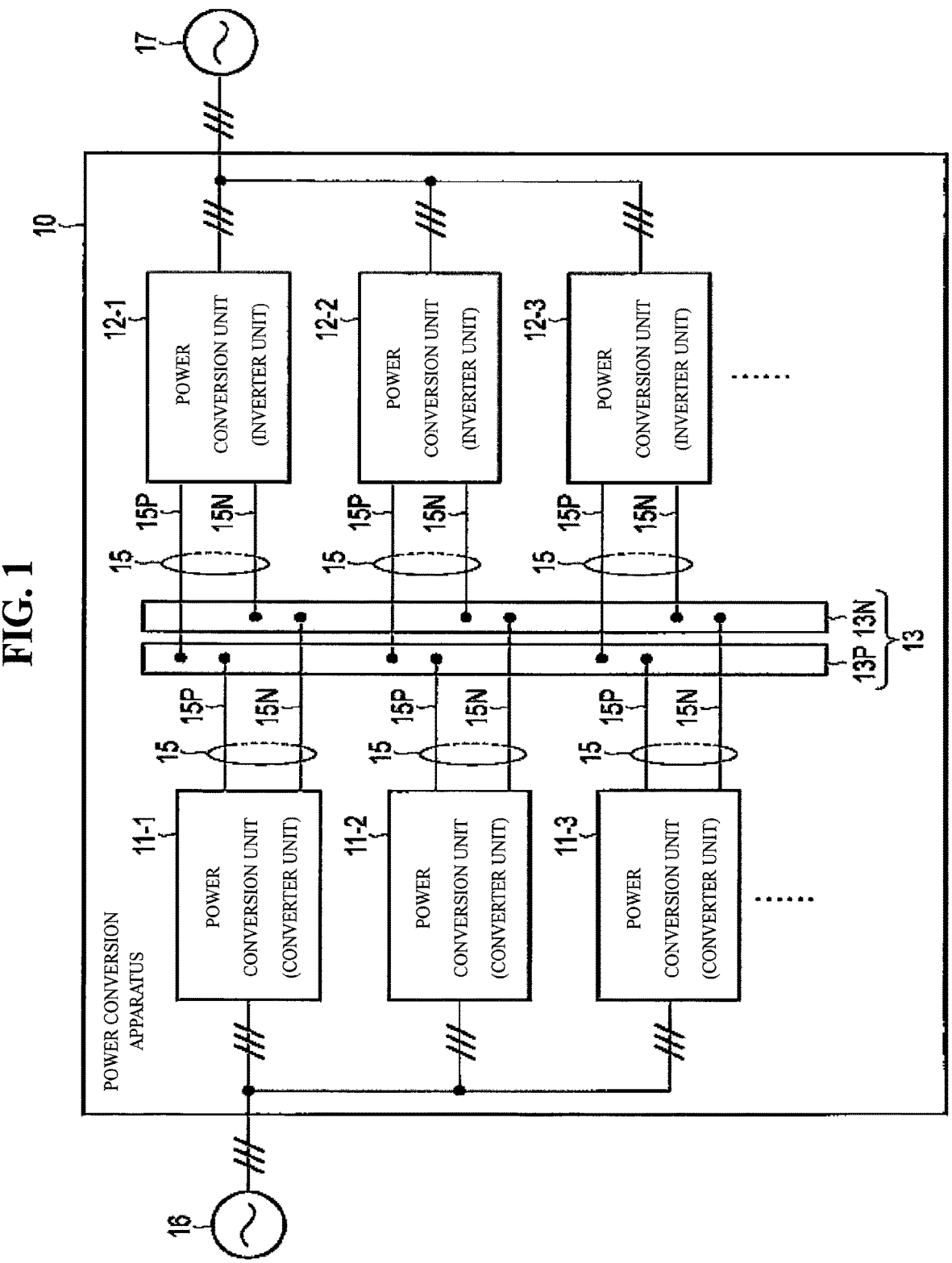
FIG. 1 is a diagram showing a configuration of a power conversion apparatus according to an embodiment of the present invention.

FIG. 1 shows a power conversion apparatus 10 according to an embodiment of the present invention. The power conversion apparatus 10 includes one or more power conversion units configured to function as a converter for converting a first AC power into DC power, and one or more power conversion units configured to function as an inverter for converting the DC power into a second AC power.

The power conversion apparatus 10 operates as a BTB (back to back) power converting apparatus in which the one or more power conversion units functioning as converters and the one or more power conversion units functioning as inverters are arranged with their DC sides abutted against each other.

In FIG. 1, it is supposed that the power conversion apparatus 10 includes three power conversion units (converter units) 11-1, 11-2 and 11-3 functioning as converters and three power conversion units (inverter units) 12-1, 12-2 and 12-3 functioning as inverters.

The number of each of the converter unit and the inverter unit provided in the power conversion apparatus 10 is not limited to the above example. The number of each of these converter units and inverter units can be set to one or more arbitrary values. For example, as examples of the configuration of the power conversion apparatus 10, one converter unit and one inverter unit may be provided, or one converter unit and two or more inverter units may be provided, or two converter units and two or more inverter units may be provided, or two or more converter units and two or more inverter units may be provided.

Each of the power conversion units (converter units) 11-1, 11-2, and 11-3 includes at least a single-phase full-bridge circuit or a three-phase inverter circuit. In this case, each of the power conversion units (converter units) 11-1, 11-2, and 11-3 includes a plurality of semiconductor switching elements. By a switching-control of these semiconductor switching elements by the gate control signals such as pulse width modulation signals (PWM signals), each of these power conversion units (converter units) 11-1, 11-2, and 11-3 converts an input AC power into the DC power.

Each of the power conversion units (inverter units) 12-1, 12-2, and 12-3 also includes at least a single-phase full bridge circuit or a three-phase inverter circuit. In this case, each of the power conversion units (inverter units) 12-1, 12-2, and 12-3 includes a plurality of semiconductor switching elements. By a switching-control of these semiconductor switching elements by the gate control signals such as pulse width modulation signals (PWM signals), each of these power conversion units (inverter units) 12-1, 12-2, and 12-3 converts the DC power into an AC power of desired frequency (for example, a three-phase AC power).

The common bus bar 13 connects to each of DC sides of the power conversion units (converter units) 11-1, 11-2 and 11-3 and the power conversion units (inverter units) 12-1, 12-2 and 12-3. That is, the DC side of each of the power conversion units (converter units) 11-1, 11-2 and 11-3 and the power conversion units (inverter units) 12-1, 12-2 and 12-3 is connected to the DC side of each of the other power conversion units via the common bus bar 13. The common bus bar 13 is a common DC conductor (common DC bus bar) for flowing a large amount of DC power between the power conversion units. The power conversion apparatus 10 includes six unit bus bars 15 corresponding to the six power conversion units 11-1, 11-2, 11-3, 12-1, 12-2, and 12-3 respectively. The DC side of each of the power conversion units 11-1, 11-2, 11-3, 12-1, 12-2 and 12-3 is connected to the common bus bar 13 via each corresponding unit bus bar 15.

The AC side of each of the power conversion units (converter units) 11-1, 11-2 and 11-3 is connected to an AC power system 16. The AC power system 16 may be a generator that generates AC power or may be a commercial AC power system. The DC side of each of the power conversion units (converter units) 11-1, 11-2 and 11-3 is connected to the common bus bar 13 via each unit bus bar 15 corresponding to the power conversion unit. Each unit bus bar 15 is a connection conductor that connects the DC side of the corresponding power conversion unit (converter unit) to the common bus bar 13.

The DC side of each of the power conversion units (inverter units) 12-1, 12-2 and 12-3 is also connected to the common bus bar 13 via each unit bus bar 15 corresponding to the power conversion unit. Each unit bus bar 15 is a connection conductor that connects the DC side of the corresponding power conversion unit (inverter unit) to the common bus bar 13. The AC side of each of the power conversion units (inverter units) 12-1, 12-2 and 12-3 is connected to an AC power system 17. The AC power system 17 may be an AC load driven by AC power, or may be a commercial AC power system which is different from the AC power system corresponding to the AC power system 16.

As described above, the common bus bar 13 is the common DC conductor to which the DC side of each of the six power conversion units 11-1, 11-2, 11-3, 12-1, 12-2 and 12-3 electrically connects. The common bus bar 13 is constructed of a long conductive plate, for example, a long copper plate. Each unit bus bar 15 is also constructed of a long conductive plate, for example, a long copper plate.

The common bus bar 13 is a pair of common bus bars. That is, the common bus bar 13 includes a common bus bar 13P for positive DC power and a common bus bar 13N for negative DC power. Each unit bus bar 15 is also a pair of unit bus bars. That is, each of the unit bus bar 15 includes a positive electrode unit bus bar 15P and a negative electrode unit bus bar 15N. The positive electrode unit bus bar 15P connects a positive electrode terminal on the DC side of the corresponding power conversion unit to the common bus bar 13P for the positive DC power. The negative electrode unit bus bar 15N connects a negative electrode terminal on the DC side of the corresponding power conversion unit to the common bus bar 13N for the negative DC power.

Each of the common bus bars 13P for the positive DC power and the common bus bars 13N for the negative DC power is constructed of a long conductive plate, for example, a long copper plate. Likewise, each of the positive electrode unit bus bar 15P and the negative electrode unit bus bar 15N is also constructed of a long conductive plate, for example, a long copper plate.

A positive electrode terminal and a negative electrode terminal on the DC side of the power conversion unit (converter unit) 11-1 are respectively connected to the common bus bar 13P for the positive (P) DC power and the common bus bar 13N for the negative (N) DC power via the positive electrode unit bus bar 15P and the negative electrode unit bus bar 15N for this power conversion unit (converter unit) 11-1. A positive electrode terminal and a negative electrode terminal on the DC side of the power conversion unit (converter unit) 11-2 are respectively connected to the common bus bar 13P for the positive (P) DC power and the common bus bar 13N for the negative (N) DC power via the positive electrode unit bus bar 15P and the negative electrode unit bus bar 15N for this power conversion unit (converter unit) 11-2. A positive electrode terminal and a negative electrode terminal on the DC side of the power conversion unit (converter unit) 11-3 are respectively connected to the common bus bar 13P for the positive (P) DC power and the common bus bar 13N for the negative (N) DC power via the positive electrode unit bus bar 15P and the negative electrode unit bus bar 15N for this power conversion unit (converter unit) 11-3.

Similarly, a positive electrode terminal and a negative electrode terminal on the DC side of the power conversion unit (inverter unit) 12-1 are respectively connected to the common bus bar 13P for the positive (P) DC power and the common bus bar 13N for the negative (N) DC power via the positive electrode unit bus bar 15P and the negative electrode unit bus bar 15N for this power conversion unit (inverter unit) 12-1. A positive electrode terminal and a negative electrode terminal on the DC side of the power conversion unit (inverter unit) 12-2 are respectively connected to the common bus bar 13P for the positive (P) DC power and the common bus bar 13N for the negative (N) DC power via the positive electrode unit bus bar 15P and the negative electrode unit bus bar 15N for this power conversion unit (inverter unit) 12-2. A positive electrode terminal and a negative electrode terminal on the DC side of the power conversion unit (inverter unit) 12-3 are respectively connected to the common bus bar 13P for the positive (P) DC power and the common bus bar 13N for the negative (N) DC power via the positive electrode unit bus bar 15P and the negative electrode unit bus bar 15N for this power conversion unit (inverter unit) 12-3.

When the frequency of the AC power from the AC power system 16 is different from the frequency of the AC power for the AC power system 17, each switching frequency of the power conversion units (converter units) 11-1, 11-2, and 11-3 is different from each switching frequency of the power conversion units (inverter units) 12-1, 12-2, and 12-3.

There is a case where each switching operation of the power conversion units (converter units) 11-1, 11-2, and 11-3 is independently controlled from each switching operation of the power conversion units (inverter units) 12-1, 12-2, and 12-3. In such a case, each switching frequency of the power conversion units (converter units) 11-1, 11-2, and 11-3 may be different from each switching frequency of the power conversion units (inverter units) 12-1, 12-2, and 12-3.

High-frequency ripple noise tends to occur in the DC input/output power between the converter unit and the inverter unit in the case where each switching frequency of the power conversion units (converter units) 11-1, 11-2, and 11-3 is different from each switching frequency of the power conversion units (inverter units) 12-1, 12-2, and 12-3. This ripple noise of DC power is called a ripple current. This ripple current is sometimes referred to as a DC ripple current or a DC power ripple.

For example, each ripple current from the power conversion units (converter units) 11-1, 11-2, and 11-3 flows into each power conversion units (inverter units) 12-1, 12-2, and 12-3 via the common bus bars 13P and 13N. Each ripple current from the power conversion units (converter units) 11-1, 11-2, and 11-3 is caused by each switching operation of the semiconductor switching elements in the power conversion units (converter units) 11-1, 11-2, and 11-3.

Similarly, each ripple current from the power conversion units (inverter units) 12-1, 12-2, and 12-3 may flow into each power conversion units (converter units) 11-1, 11-2, and 11-3 via the common bus bars 13P and 13N. Each ripple current from the power conversion units (inverter units) 12-1, 12-2, and 12-3 is caused by each switching operation of the semiconductor switching elements in the power conversion units (inverter units) 12-1, 12-2, and 12-3.

As described above, when the power conversion apparatus 10 has the configuration in which each DC side of the power conversion units 11-1, 11-2, 11-3, 12-1, 12-2 and 12-3 is connected in parallel to the common bus bar 13 (i.e. the pair of the common bus bars 13P and 13N), a ripple current from each power conversion unit may flow into another power conversion unit, so that DC capacitors in these power conversion units may start to resonate with each other. This may cause undesirable phenomena such as an increase in power loss by these DC capacitors or an increase in heat generation amount of these DC capacitors.

Figure 2:
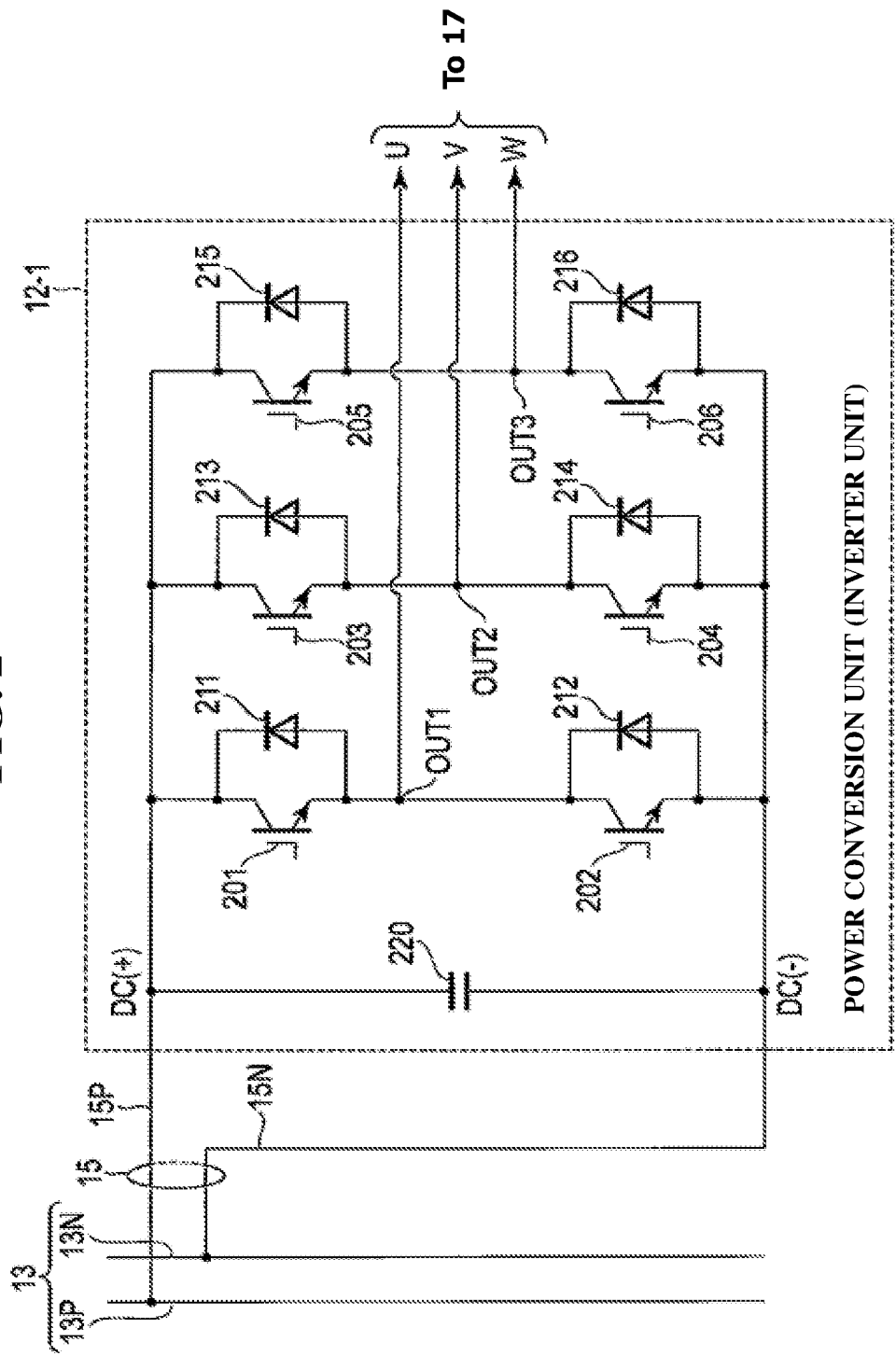
FIG. 2 is a diagram showing a circuit configuration of a power conversion unit which functions as an inverter.

FIG. 2 shows a configuration example of a power conversion circuit included in the power conversion unit (inverter unit) 12-1.

Here, it is assumed that the power conversion circuit included in the power conversion unit (inverter unit) 12-1 is configured as a three-phase inverter.

The power conversion circuit (three-phase inverter) includes six semiconductor switching elements (here, IGBTs) 201 to 206, six diodes 211 to 216, and a DC capacitor 220. A positive DC power terminal DC(+) of this power conversion circuit (three-phase inverter) is a positive electrode terminal on the DC side of this power conversion circuit. The positive DC power terminal DC(+) is connected to the common bus bar 13P for the positive DC power (P) via the unit bus bar 15P for the power conversion unit (inverter unit) 12-1. A negative DC power terminal DC(−) of this power conversion circuit (3-phase inverter) is a negative electrode terminal on the DC side of this power conversion circuit. The negative DC power terminal DC(−) is connected to the common bus bar 13N for the negative DC power (N) via the unit bus bar 15N for the power conversion unit (inverter unit) 12-1.

The IGBT 201 and the IGBT 202 are connected in series between the positive DC power terminal DC(+) and the negative DC power terminal DC(−). The IGBT 201 and the diode 211 are connected in antiparallel to each other. The IGBT 202 and the diode 212 are also connected in antiparallel to each other. A series connection point OUT1 between the IGBT 201 and the IGBT 202 has a function of an AC power output terminal for U-phase.

The IGBT 203 and the IGBT 204 are connected in series between the positive DC power terminal DC(+) and the negative DC power terminal DC(−). The IGBT 203 and the diode 213 are connected in antiparallel to each other. The IGBT 204 and the diode 214 are also connected in antiparallel to each other. A series connection point OUT2 between the IGBT 203 and the IGBT 204 has a function of an AC power output terminal for V-phase.

The IGBT 205 and the IGBT 206 are connected in series between the positive DC power terminal DC(+) and the negative DC power terminal DC(−). The IGBT 205 and the diode 215 are connected in antiparallel to each other. The IGBT 206 and the diode 216 are also connected in antiparallel to each other. A series connection point OUT3 between the IGBT 205 and the IGBT 206 has a function of an AC power output terminal for W-phase.

The DC capacitor 220 is connected between the positive DC power terminal DC(+) and the negative DC power terminal DC(−). The DC capacitor 220 suppresses fluctuation of the DC voltage caused by the switching operation of the IGBTs 201 to 206.

The other power conversion units (inverter units) 12-2, 12-3 also have the same configuration as the power conversion unit (inverter unit) 12-1.

Figure 3:
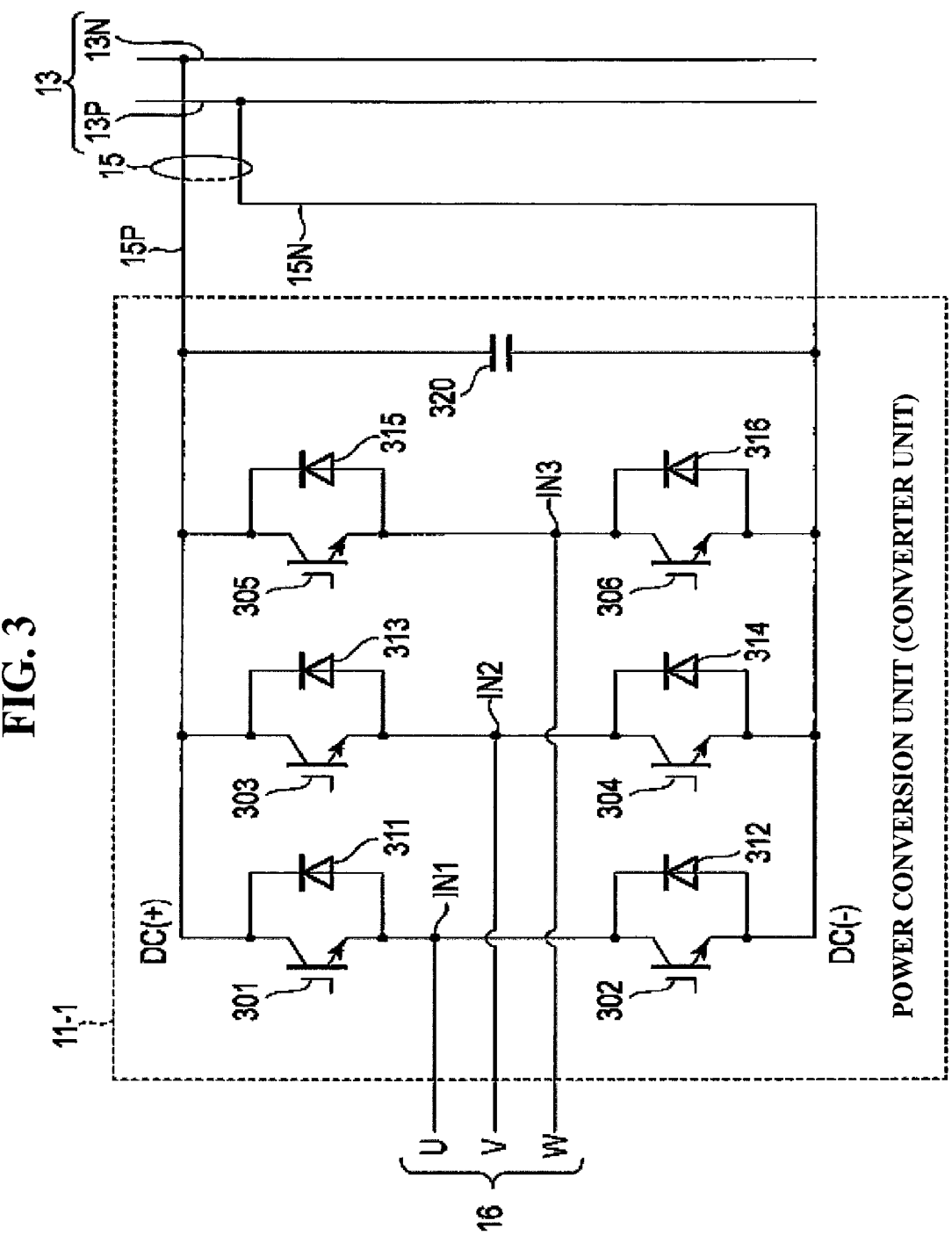
FIG. 3 is a diagram showing a circuit configuration of a power conversion unit that functions as a converter.

FIG. 3 shows a configuration example of a power conversion circuit included in the power conversion unit (converter unit) 11-1.

Here, it is assumed that the power conversion circuit included in the power conversion unit (converter unit) 11-1 is configured to have a circuit configuration symmetrical with the above-described three-phase inverter.

This power conversion circuit includes six semiconductor switching elements (here, IGBTs) 301 to 306, six diodes 311 to 316, and a DC capacitor 320. A positive DC power terminal DC(+) of this power conversion circuit is a positive electrode terminal on the DC side of this power conversion circuit. The positive DC power terminal DC(+) is connected to the common bus bar 13P for the positive DC power (P) via the unit bus bar 15P for the power conversion unit (converter unit) 11-1. A negative DC power terminal DC(−) of this power conversion circuit is a negative electrode terminal on the DC side of this power conversion circuit. The negative DC power terminal DC(−) is connected to the common bus bar 13N for the negative DC power (N) via the unit bus bar 15N for the power conversion unit (converter unit) 11-1.

The IGBT 301 and the IGBT 302 are connected in series between the positive DC power terminal DC(+) and the negative DC power terminal DC(−). The IGBT 301 and the diode 311 are connected in antiparallel to each other. The IGBT 302 and the diode 312 are also connected in antiparallel to each other. A series connection point IN1 between the IGBT 301 and the IGBT 302 has a function of an AC power input terminal for the U-phase.

IGBT 303 and IGBT 304 are connected in series between the positive DC power terminal DC(+) and the negative DC power terminal DC(−). The IGBT 303 and the diode 313 are connected in antiparallel to each other. The IGBT 304 and the diode 314 are also connected in antiparallel to each other. A series connection point IN2 between the IGBT 303 and the IGBT 304 has a function of an AC power input terminal for the V-phase.

IGBT 305 and IGBT 306 are connected in series between the positive DC power terminal DC(+) and the negative DC power terminal DC(−). The IGBT 305 and the diode 315 are connected in antiparallel to each other. The IGBT 306 and the diode 316 are also connected in antiparallel to each other. A series connection point IN3 between the IGBT 305 and the IGBT 306 has a function of an AC power input terminal for the W-phase.

The DC capacitor 320 is connected between the positive DC power terminal DC(+) and the negative DC power terminal DC(−). The DC capacitor 320 suppresses fluctuation of the DC voltage caused by the switching operation of the IGBTs 301 to 306.

The other power conversion units (converter units) 11-2 and 11-3 also have the same configuration as the power conversion unit (converter unit) 11-1.

Figure 4:
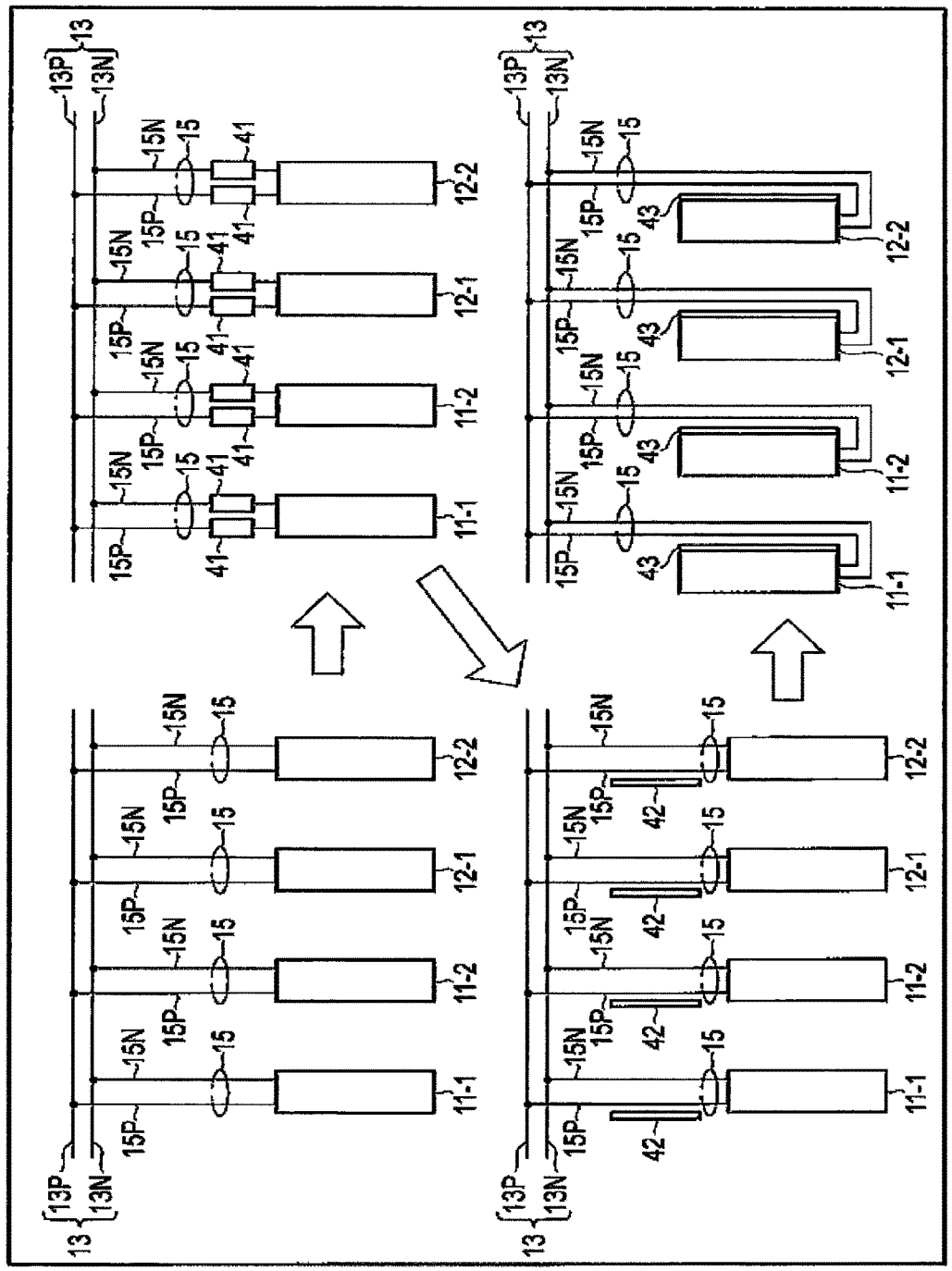
FIG. 4 is a diagram showing a connection relationship between a common bus bar and each of the power conversion units included in the power conversion apparatus according to the embodiment.

FIG. 4 shows a connection relationship between each power conversion unit and the common bus bar included in the power conversion apparatus 10.

Here, it is assumed that the power conversion apparatus 10 includes two power conversion units (converter units) 11-1, 11-2 and two power conversion units (inverter units) 12-1, 12-2.

As shown in the upper left part of FIG. 4, the DC side of each of the power conversion units (converter units) 11-1 and 11-2 and the power conversion units (inverter units) 12-1 and 12-2 is connected in parallel to the common bus bar 13.

More particularly, the power conversion apparatus 10 includes four unit bus bars 15 corresponding to the power conversion units (converter units) 11-1 and 11-2 and the power conversion units (inverter units) 12-1 and 12-2 respectively. Each DC side of the power conversion units (converter units) 11-1 and 11-2 and the power conversion units (inverter units) 12-1 and 12-2 is connected to the common bus bar 13P for the positive DC power (P) and the common bus bar 13N for the negative DC power (N) via the unit bus bars 15P, 15N corresponding thereto.

When the power conversion apparatus 10 has the configuration in which each DC side of the power conversion units (converter units) 11-1 and 11-2, and the power conversion units (inverter units) 12-1 and 12-2 is connected in parallel to the common bus bar 13, the ripple current from each power conversion unit may flow into another power conversion unit via the common bus bar 13 as described above.

As a countermeasure for suppressing the inflow of the ripple current from the other power conversion unit to each power conversion unit, as shown in the upper right part of FIG. 4, in order to reduce the ripple current, it may be thought that a reactor 41 may be inserted at each unit bus bar 15 for each power conversion unit. In the upper right part of FIG. 4, the reactor 41 is inserted in each of the unit bus bars 15P, 15N. However, even if the reactor 41 is inserted only in the unit bus bar 15P, the inflow of the ripple current may be suppressed to some extent.

However, when the method of inserting the reactor 41 into each unit bus bar 15 is applied to the power conversion apparatus 10, it is necessary to provide the reactor 41 for each individual power conversion unit. This may cause an increase in the number of power components required for the power conversion apparatus 10 or an increase in the cost of the power conversion apparatus 10.

Therefore, the power conversion apparatus 10 of the present embodiment includes a configuration in which a magnetic member 42, such as an iron plate, is provided in the vicinity of each bus bar 15, as shown in the lower left portion of FIG. 4, instead of inserting the reactor 41 to each unit bus bar 15. The lower left part of FIG. 4 illustrates an example in which the magnetic member 42 is arranged in the vicinity of each unit bus bar 15P. However, the magnetic member 42 may be disposed at a position close to both of a pair of unit bus bars (the positive electrode unit bus bar 15P and the negative electrode unit bus bar 15N) constituting one unit bus bar 15.

Usually, the unit bus bars 15P, 15N constituting one unit bus bar 15 are arranged close to each other so that a magnetic field generated by the DC current flowing through the unit bus bar 15P is canceled by a magnetic field generated by the reverse DC current flowing through the unit bus bar 15N.

Therefore, the magnetic member 42 may be provided in the vicinity of the pair of the unit bus bars 15P, 15N so that a surface of the magnetic member 42 faces both of the unit bus bars 15P, 15N with a gap. As a result, the inductance values of both of the unit bus bars 15P, 15N can be increased since the magnetic member 42 can be arranged in the vicinity of the pair of unit bus bars 15P, 15N. Therefore, it is possible to suppress the inflow of the ripple current from the other power conversion unit to each power conversion unit without inserting the reactor 41 into the unit bus bar 15.

As the distance between the magnetic member 42 and each of the unit bus bars 15P, 15N is shorter, the inductance value of each of the unit bus bars 15P, 15N increases. Therefore, the magnetic member 42 may be provided at a position as close to the pair of the unit bus bar 15P, 15N as possible so that each inductance value of the unit bus bars 15P, 15N increases to be an inductance value capable of suppressing the inflow of ripple current from other power conversion units.

The power conversion apparatus 10 of another embodiment may be configured, as shown in the lower right part of FIG. 4, so that a magnetic material plate (outer plate) 43 such as an iron plate is disposed on a certain surface of a casing of each power conversion unit and the outer plate 43 of the casing is disposed in the vicinity of the unit bus bar 15.

In this case, in each power conversion unit, the outer plate 43 of the casing is arranged in the vicinity of the corresponding unit bus bar 15 and the outer plate 43 faces the corresponding unit bus bar 15 with a gap so that the inductance value of the corresponding unit bus bar 15 (for example, the inductance value of each of the unit bus bars 15P, 15N) is increased to an inductance value capable of suppressing the inflow of the ripple current from the other power conversion unit to this power conversion unit. As mentioned above, as the distance between the outer plate 43 and each of the unit bus bars 15P, 15N is shorter, the inductance value of each of the unit bus bars 15P, 15N increases. Therefore, the gap (distance) between the outer plate 43 and the unit bus bar 15 may be set as narrow (short) as possible within a range where electrical insulation therebetween is maintained.

As described above, since the pair of the unit bus bars 15P and 15N are disposed close to each other, the outer plate 43 is provided in the vicinity of the pair of the unit bus bars 15P, 15N so that the surface of the outer plate 43 faces both of the unit bus bars 15P, 15N with the gap. The outer plate 43 of the magnetic material is a path through which the magnetic field generated by the DC current flowing through the unit bus bar 15P passes. Further, the outer plate 43 of the magnetic material also serves as a path through which a magnetic field generated by the reverse DC current flowing through the unit bus bar 15N passes. Therefore, since each inductance value (inductance component) of the unit bus bars 15P and 15N can be increased, it is possible to suppress the inflow of the ripple current from the other power conversion units to this power conversion unit.

In the structure shown in the lower right part of FIG. 4, a part (outer plate 43) of the casing of each power conversion unit is used as the above-described magnetic member 42. Accordingly, since the ripple current flowing through the unit bus bar 15 can be reduced without preparing the dedicated magnetic member 42, the inflow of the ripple current can be suppressed without an increase in the number of power components necessary for constructing the power conversion apparatus 10.

Figure 5:
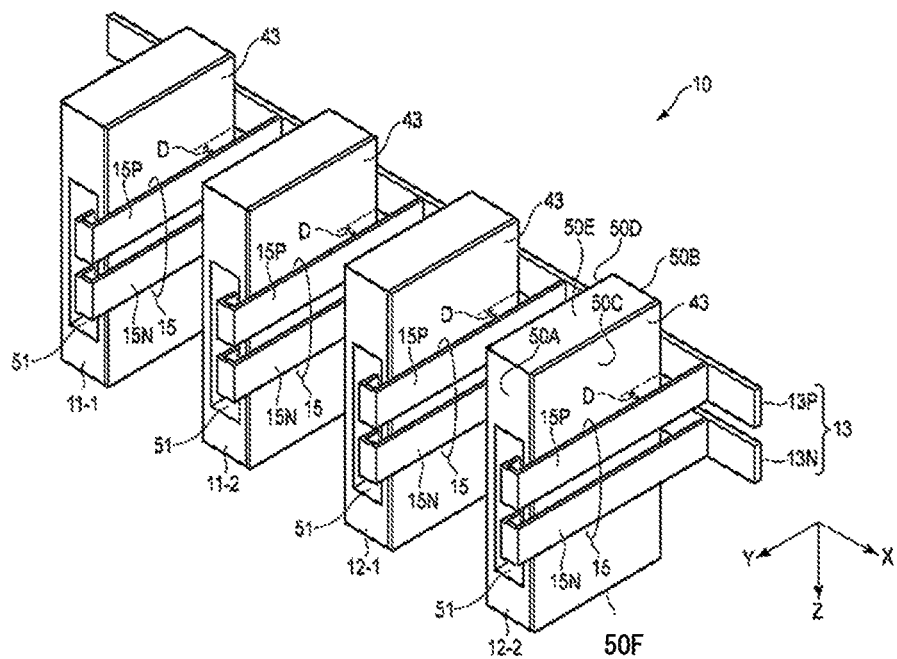
FIG. 5 is a perspective view showing an arrangement example of a plurality of power conversion units included in the power conversion apparatus according to the embodiment.
Figure 6:
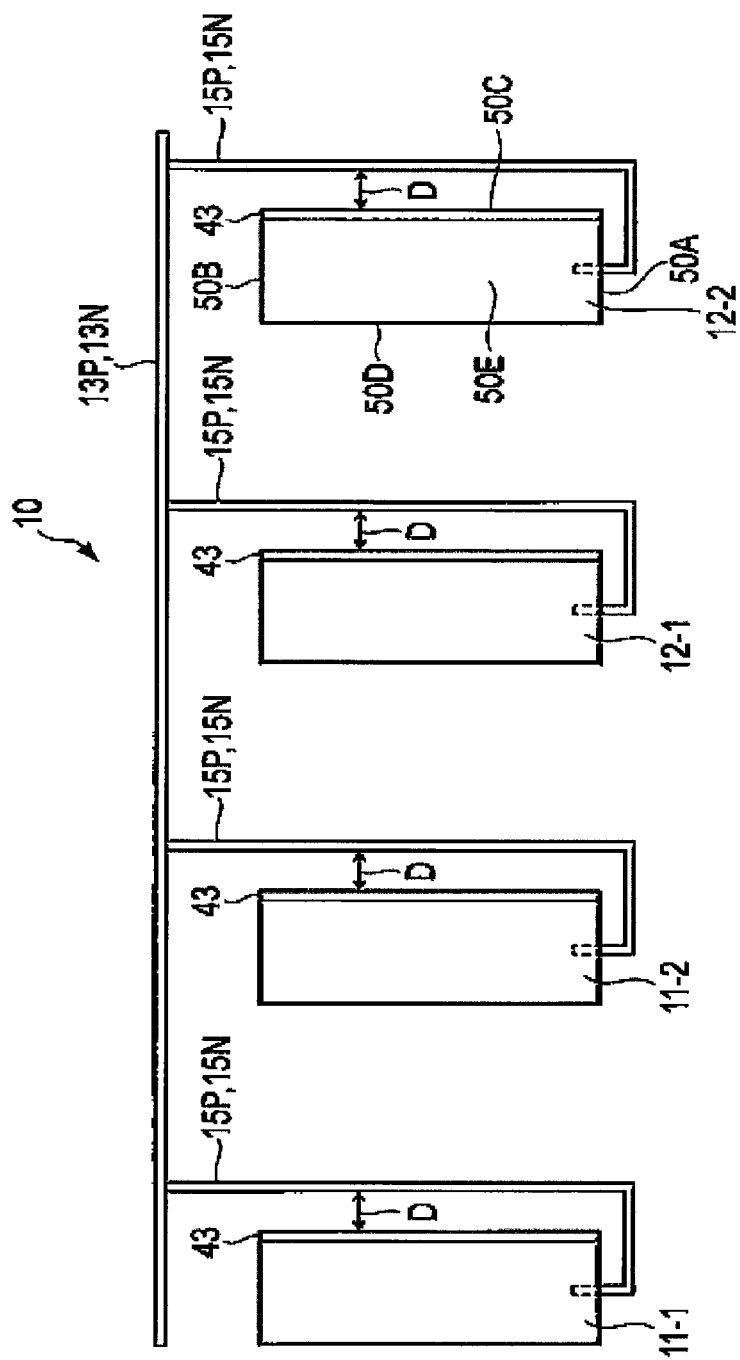
FIG. 6 is a plan view showing an arrangement example of a plurality of power conversion units included in the power conversion apparatus according to the embodiment.

FIG. 5 is a perspective view showing an arrangement example of a plurality of power conversion units included in the power conversion apparatus 10. FIG. 6 is a plan view of the arrangement of the power conversion unit of FIG. 5 as viewed from above.

The arrangement examples of the power conversion units in FIG. 5 and FIG. 6 correspond to the arrangement for realizing the structure shown in the lower right part of FIG. 4.

Each of the power conversion units (converter units) 11-1, 11-2 and the power conversion units (inverter units) 12-1, 12-2 has a box-shaped casing. The casing of each power conversion unit accommodates at least the inverter of FIG. 2 or the converter of FIG. 3. The casing of each the power conversion unit includes a front surface 50A, a back surface 50B, a right-side surface 50C, a left-side surface 50D, an upper surface 50E, and a bottom surface 50F. The outer plate 43 made of a magnetic material is disposed on a certain first surface, such as the right-side surface 50C, of the casing of each power conversion unit. The outer plate 43 may be, for example, an iron plate. The outer plate 43 can function as a frame (also called a panel) for mounting various parts. An outer plate made of a stainless steel material (SUS) may be arranged on each of the other surfaces.

The common bus bar 13 extends in a first direction, for example, a horizontal direction (X-direction). That is, the longitudinal direction of the common bus bar 13 extends in parallel with the horizontal direction (X-direction). The pair of common bus bars 13P, 13N included in the common bus bar 13 extend in parallel to each other in the horizontal direction (X-direction).

The plurality of the unit bus bars 15 include end portions that are connected to a plurality of connection points disposed on the common bus bar 13 along the longitudinal direction of the common bus bar 13. That is, one end portion of each of the unit bus bars 15 is connected to the common bus bar 13. Each of the unit bus bars 15 is extended in a direction (here, Y-direction) perpendicular to the longitudinal direction (here, the X-direction) of the common bus bar 13. In this case, each unit bus bar 15 may be formed so as to protrude from each corresponding connection portion on the common bus bar 13.

For example, in each unit bus bar 15, the positive electrode unit bus bar 15P may be protruded from the common bus bar 13P, and may extend in the direction (Y-direction) perpendicular to the longitudinal direction of the common bus bar 13P. For example, in each unit bus bar 15, the negative electrode unit bus bar 15N may be protruded from the common bus bar 13N, and may extend in the direction (Y-direction) perpendicular to the longitudinal direction of the common bus bar 13N.

Each casing of the power conversion units (converter units) 11-1, 11-2 and the power conversion units (inverter units) 12-1, 12-2 is arranged in the vicinity of each connection point between the corresponding unit bus bar 15 and the common bus bar 13.

The right-side surface 50C (the outer plate 43) of the casing of each of the power conversion units (converter units) 11-1, 11-2 and the power conversion units (inverter units) 12-1, 12-2 is arranged in the vicinity of the corresponding unit bus bar 15 and faces the corresponding unit bus bar 15 with a gap (distance D) therebetween so that the inductance value of the corresponding unit bus bar 15 increases to an inductance value capable of suppressing the inflow of the ripple current from the other power conversion unit in the power conversion device 10. As described above, the gap (distance D) between the outer plate 43 and the unit bus bar 15 may be set as narrow (short) as possible within a range where electrical insulation therebetween is maintained.

Each unit bus bar 15 extends along the outer plate 43 in a direction from a second surface (for example, the back surface 50B) to a third surface of the casing (for example, the front surface 50A) opposite to the second surface, and the second surface is perpendicular to the right-side surface 50C of the casing of the power conversion unit corresponding to the unit bus bar 15. This structure makes it possible to relatively enlarge an area of the region where the outer plate 43 and the unit bus bar 15 face each other. Therefore, the inductance value of the unit bus bar 15 can be increased efficiently.

The distal end portion (the other end portion) of each unit bus bar 15 is bent, and is electrically connected to the corresponding power conversion unit via an opening 51 formed on the front surface 50A of the casing of each power conversion unit. With this structure, the length of each unit bus bar 15 can be increased, and thus the inductance component of each unit bus bar 15 can be increased.

The pair of unit bus bars 15P, 15N included in each unit bus bar 15 is arranged in a plane parallel to the right-side surface 50C (the outer plate 43) of the casing of the corresponding power conversion unit. For example, in FIG. 6, the pair of unit bus bars 15P, 15N included in each unit bus bar 15 is arranged in a vertical direction, that is in a perpendicular direction (Z-direction), thereby these unit bus bars 15P, 15N are arranged in a plane parallel to the right-side surface 50C (the outer plate 43). Accordingly, the right-side surface 50C (the outer plate 43) of the casing of each power conversion unit is arranged in the vicinity of both of the unit bus bars 15P, 15N included in the corresponding unit bus bar 15, and faces both of the unit bus bars 15P, 15N included in the corresponding unit bus bar 15 with a gap (distance D). This makes it possible that the inductance values of each of the unit bus bars 15P, 15N can be effectively increased since both of the distance between the outer plate 43 and the unit bus bar 15P and the distance between the outer plate 43 and the unit bus bar 15N can be sufficiently short.

The common bus bar 13 faces with a gap the back surface 50B of the each casing of the power conversion units (converter units) 11-1, 11-2 and the power conversion units (inverter units) 12-1, 12-2. The gap (distance) between the back surface 50B and the common bus bar 13 may be set relatively short. As a result, the distance between the side face of the outer plate 43 (the side face of the outer plate 43 located on the back surface 50B side of the casing) and the common bus bar 13 also becomes short. Thereby, the inductance value of the common bus bar 13 can also be increased by the outer plate 43 of the magnetic material.

The common bus bar 13P and the common bus bar 13N included in the common bus bar 13 are arranged in a plane parallel to the back surface 50B of each casing of the power conversion units (converter units) 11-1, 11-2 and the power conversion units (inverter units) 12-1, 12-2. For example, in FIG. 6, the pair of the common bus bars 13P, 13N included in the common bus bar 13 is arranged in the vertical direction, that is in the perpendicular direction (Z-direction), thereby these common bus bars 13P, 13N are arranged in a plane parallel to the back surface 50B. Further, the back surface 50B of each casing of the power conversion units faces both of the common bus bars 13P, 13N with a gap. As a result, it is possible to shorten both of the distance between the side face of the outer plate 43 (the side face of the outer plate 43 located on the back surface 50B side of the casing) and the common bus bar 13P and the distance between the side face of the outer plate 43 (the side face of the outer plate 43 located on the back surface 50B side of the casing) and the common bus bar 13N. Thereby, the inductance value of each of the common bus bar 13P and the common bus bar 13N can also be increased by the outer plate 43 of the magnetic material.

FIGS. 5 and 6 illustrate an example in which the pair of the common bus bars 13P, 13N are positioned at the back surface 50B side of the each casing of the power conversion units. However, the pair of the common bus bars 13P, 13N may be positioned at the upper surface 50E side of each casing of the power conversion units.

In this case, the pair of the unit bus bars 15P, 15N may extend along the outer plate 43 in a direction from the upper surface 50E to the bottom surface 50F of the casing of each power conversion unit. Each distal end portion of the pair of the unit bus bars 15P, 15N may be inserted into an opening formed in the bottom surface 50F of the casing of each power conversion unit.

According to the arrangement of the power conversion units shown in FIGS. 5 and 6, since each of the outer plates 43 of the power conversion units (converter units) 11-1, 11-2 and the power conversion units (inverter units) 12-1, 12-2 is close to the unit bus bar 15 (the pair of the unit bus bars 15P and 15N), the inductance value of the unit bus bar 15 (the pair of the unit bus bars 15P, 15N) can be increased. Therefore, it is possible to suppress the inflow of the ripple current from the other power conversion units to each power conversion units without inserting a reactor into the unit bus bar 15.

In addition, the back surface 50B of each casing of the power conversion units (converter units) 11-1, 11-2 and the power conversion units (inverter units) 12-1, 12-2 faces with a gap the common bus bar 13 (the pair of the common bus bars 13P, 13N), and the outer plate 43 of the right-side surface 50C of the casing faces the corresponding unit bus bar 15 (the pair of the unit bus bars 15P, 15N) with a gap, resulting in that the outer plate 43 can be arranged at a position close to both of the pair of the unit bus bars 15P, 15N. Therefore, each inductance value of the pair of the unit bus bars 15P, 15N can be increased. Furthermore, it is also easy to shorten the distance between the side face of the outer plate 43 (the side face of the outer plate 43 on the back surface 50B side of the casing) and the common bus bar 13 (the pair of common bus bars 13P, 13N). Therefore, the outer plate 43 can also play a role of increasing the inductance value of each of the pair of the common bus bars 13P, 13N to some extent. This not only increases the inductance value of each unit bus bar 15 but also increases the inductance value of the pair of the common bus bars 13P, 13N to some extent.

The unit bus bar 15 (the pair of the unit bus bars 15P, 15N) extends along the outer plate 43 in a direction from the back surface 50B (or the upper surface 50E) to the front surface 50A (or the bottom surface 50F) of the casing of each power conversion unit. Thereby, it is possible to relatively enlarge the area of the region where the outer plate 43 and the unit bus bar 15 (the pair of the unit bus bars 15P, 15N) face each other. Therefore, the inductance value of the unit bus bar 15 (the pair of the unit bus bars 15P, 15N) can be increased efficiently.

As described above, in the present embodiment, each power conversion unit includes the casing having the surface on which the outer plate 43 of the magnetic material is disposed. The outer plate 43 of the casing is arranged in the position close to the corresponding unit bus bar 15 so that the inductance value of the corresponding unit bus bar 15 increases to the inductance value capable of suppressing the inflow of the ripple current from other power conversion units to each power conversion units. Therefore, it is possible to suppress the inflow of the ripple current from the other power conversion units to each power conversion units without inserting the reactor into the unit bus bar 15.

It should be noted that, since the outer plate 43 may be made of a magnetic material, the outer plate 43 is not limited to an iron plate, and may be a plate made of another material among magnetic materials. In addition, the outer plate 43 may have a plurality of the openings.

The present invention is not limited to the above embodiments as it is, and it can be embodied by modifying component elements in the implementation stage without departing from the gist thereof. Further, various inventions can be formed by appropriately combining a plurality of component elements disclosed in the above embodiments. For example, some component elements may be omitted from all the component elements shown in the embodiments. Further, the component elements of different embodiments may be appropriately combined.

INDUSTRIAL APPLICABILITY

According to the present invention, it is possible to provide a power conversion apparatus including a plurality of power conversion units and capable of suppressing inflow of a ripple current.

The invention claimed is:

1. A power conversion apparatus comprising:
   a plurality of power conversion units including at least a first power conversion unit having a plurality of semiconductor switching elements and converting AC power into DC power and a second power conversion unit having a plurality of semiconductor switching elements and converting DC power into AC power;
   a common bus bar; and
   a plurality of unit bus bars provided so as to correspond to the plurality of power conversion units respectively and connecting each DC side of the plurality of power conversion units to the common bus bar; wherein
   each of the power conversion units includes a casing having a first surface on which a first outer plate of a magnetic material is arranged, and the first outer plate is arranged in a vicinity of a corresponding unit bus bar and faces the corresponding unit bus bar with a gap so that an inductance value of the corresponding unit bus bar is increased to an inductance value capable of suppressing an inflow of a ripple current from another power conversion unit in the power conversion apparatus.

2. The power conversion apparatus according to claim 1, wherein the casing of each of the plurality of the power conversion units includes a second surface perpendicular to the first surface, and each of the plurality of the unit bus bars extends along the first outer plate in a direction from the second surface of the casing of a corresponding power conversion unit to a third surface opposite to the second surface of the casing.

3. The power conversion apparatus according to claim 2, wherein each distal end portion of the plurality of the unit bus bars is electrically connected to a corresponding power conversion unit via an opening formed on the third surface.

4. The power conversion apparatus according to claim 1, wherein each of the plurality of the unit bus bars includes a positive electrode unit bus bar and a negative electrode unit bus bar arranged in a plane parallel to the first surface of the casing of a corresponding power conversion unit, the first outer plate is arranged in a vicinity of both of the positive electrode unit bus bar and the negative electrode unit bus bar included in the corresponding unit bus bar, and faces with a gap both of the positive electrode unit bus bar and the negative electrode unit bus bar included in the corresponding unit bus bar.

5. The power conversion apparatus according to claim 1, wherein the first outer plate includes an iron plate.

6. The power conversion apparatus according to claim 1, wherein the common bus bar extends in a first direction, the plurality of the unit bus bars include distal end portions that are respectively connected to a plurality of connecting portions of the common bus bar, and extend in a second direction perpendicular to the first direction, and the casing of each of the plurality of the power conversion units is arranged in a vicinity of a connection point between a corresponding unit bus bar and the common bus bar.

7. The power conversion apparatus according to claim 6, wherein the casing of each of the plurality of the power conversion units includes a second surface perpendicular to the first surface, the second surface faces the common bus bar with a gap.

8. The power conversion apparatus according to claim 6, wherein the common bus bar includes a first common bus bar for positive DC power and a second common bus bar for negative DC power, the casing of each of the plurality of the power conversion unit includes a second surface perpendicular to the first surface, the first common bus bar and the second common bus bar are arranged in a plane parallel to the second surface of the casing of each of the plurality of the power conversion units, and the second surface of the casing of each of the plurality of the power conversion units faces with a gap both of the first common bus bar and the second common bus bar.

9. The power conversion apparatus according to claim 1, wherein the plurality of the power conversion units includes a third power conversion unit that converts DC power into AC power, the third power conversion unit includes a casing having a first surface on which a first outer plate of a magnetic material is arranged, and the first outer plate of the casing of the third power conversion unit is arranged in a vicinity of a corresponding unit bus bar corresponding to the third power conversion unit and faces the corresponding unit bus bar with a gap so that an inductance value of the corresponding unit bus bar is increased to an inductance value capable of suppressing an inflow of a ripple current from another power conversion unit in the power conversion apparatus.

10. The power conversion apparatus according to claim 9, wherein the plurality of the power conversion units includes a fourth power conversion unit that converts AC power into DC power, the fourth power conversion unit includes a casing having a first surface on which a first outer plate of a magnetic material is arranged, and the first outer plate of the casing of the fourth power conversion unit is arranged in a vicinity of a corresponding unit bus bar corresponding to the fourth power conversion unit and faces the corresponding unit bus bar with a gap so that an inductance value of the corresponding unit bus bar is increased to an inductance value capable of suppressing an inflow of a ripple current from another power conversion unit in the power conversion apparatus.

* * * * *